United States Patent
Foster, Jr. et al.

(10) Patent No.: US 7,075,539 B1
(45) Date of Patent: Jul. 11, 2006

(54) APPARATUS AND METHOD FOR PROCESSING DUAL FORMAT FLOATING-POINT DATA IN A GRAPHICS PROCESSING SYSTEM

(75) Inventors: Steven Gregory Foster, Jr., Sonora, CA (US); Thomas H. Kong, Los Altos, CA (US); Shaun Ho, Los Altos, CA (US); Matthew Papakipos, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 151 days.

(21) Appl. No.: 10/452,658

(22) Filed: May 30, 2003

(51) Int. Cl.
G06T 1/00 (2006.01)
G06K 9/72 (2006.01)
G06F 7/00 (2006.01)

(52) U.S. Cl. .................... 345/501; 382/235; 708/203
(58) Field of Classification Search ............... 345/501, 345/522, 418, 542, 503; 382/235; 708/203, 708/495
See application file for complete search history.

(56) References Cited

U.S. PATENT DOCUMENTS

| | | | | |
|---|---|---|---|---|
| 5,025,407 A | * | 6/1991 | Gulley et al. | 708/514 |
| 5,097,411 A | * | 3/1992 | Doyle et al. | 345/501 |
| 5,293,586 A | * | 3/1994 | Yamazaki et al. | 345/519 |
| 5,621,674 A | * | 4/1997 | Gray et al. | 708/203 |
| 5,790,134 A | * | 8/1998 | Lentz | 345/502 |
| 5,831,637 A | * | 11/1998 | Young et al. | 345/501 |
| 6,028,610 A | * | 2/2000 | Deering | 345/501 |
| 6,061,521 A | * | 5/2000 | Thayer et al. | 712/9 |
| 6,864,896 B1 | * | 3/2005 | Perego | 345/542 |

OTHER PUBLICATIONS

Breitfelder, K.; Messina, D. The Authoritative Dictionary of IEEE Standards Terms. 2000. IEEE Press. Seventh Edition. p. 155, 546.*
Volpe, M. "What's a Driver?". 1999. Mister Driver. http://www.mrdriver.com*
Ganier, C.J. "What is Direct Memory Access (DMA)?". Connexions. http://cnx.rice.edu/content/m11867.latest/.*
"Graphics processing unit." http://en.wikipedia.org/wiki/Graphics_processing_unit.*
"VRAM." http://www.webopedia.com/TERM/V/VRAM.html.*
Volpe, M. "What's a Driver?" 1999. Mister Driver. http://www.mrdriver.com.*

* cited by examiner

Primary Examiner—Kee M. Tung
Assistant Examiner—Joni Hsu
(74) Attorney, Agent, or Firm—Cooley Godward LLP

(57) ABSTRACT

A computing system has a graphics processor, a graphics memory, main memory, a bridge, and a central processing unit configured to process floating-point data of a first fixed size. An interconnect grid includes communication paths to link the graphics processor, the graphics memory, main memory, the bridge, and the central processing unit. A computing system component (e.g., the graphics processor or central processing unit) converts floating-point data to graphics floating-point data with a fixed size smaller than the fixed size of the floating-point data. The computing system passes the floating-point data and/or the graphics floating-point data over at least a portion of the interconnect grid. Alternately, the graphics processor may directly read and process previously compressed and stored graphics floating-point data.

10 Claims, 5 Drawing Sheets

APPARATUS AND METHOD FOR PROCESSING DUAL FORMAT FLOATING-POINT DATA IN A GRAPHICS PROCESSING SYSTEM

BRIEF DESCRIPTION OF THE INVENTION

This invention relates generally to digital computation systems optimized to process graphics data. More particularly, this invention relates to a dual format floating-point data processing technique for use in graphics processing systems.

BACKGROUND OF THE INVENTION

The Institute of Electrical and Electronics Engineers (IEEE) has produced a standard for floating-point (i.e., exponential) arithmetic. This standard specifies how single precision (32-bit) and double precision (64-bit) floating-point numbers are to be represented, as well as how arithmetic should be carried out on these numbers.

The IEEE single precision floating-point standard representation requires a 32-bit word, which may be represented as numbered from 0 to 31, left to right. The first bit is the sign bit, S, the next eight bits are exponent bits, E, and the final 23 bits are the fraction, F.

The value, V, represented by the word may be determined as follows:

If E=255 and F is nonzero, then V=NaN ("Not a number")
If E=255 and F is zero and S is 1, then V=−Infinity
If E=255 and F is zero and S is 0, then V=Infinity
If 0<E<255 then $V=(-1)^{**}S * 2^{**}(E-127)*(1.F)$, where "1.F" is intended to represent the binary number created by prefixing F with an implicit leading 1 and a binary point.
If E=0 and F is nonzero, then $V=(-1)^{**}S*2^{**}(-126)*(0.F)$, which are un-normalized values.
If E=0 and F is zero and S is 1, then V=−0
If E=0 and F is zero and S is 0, then V=0.

The IEEE double precision floating-point standard representation requires a 64-bit word, which is numbered 0 to 63, left to right. The first bit is the sign bit, S, the next eleven bits are the exponent bits, E, and the final 52 bits are the fraction F. The value of each number is determined using a scheme consistent with the 32-bit scheme outlined above.

This floating-point notation is relatively data intensive. Therefore, passing and processing such data can be expensive, particularly, in high bandwidth applications, such as graphics processing. In graphics processing environments, the precision afforded by standard exponential notation (i.e., 32-bit or 64-bit) is frequently excessive. In other words, the precision afforded by standard exponential notation does not meaningfully improve the resultant graphics output.

There is a large embedded base of graphics computational systems that rely upon standard exponential notation. In addition, future graphics computational systems are designed to support standard exponential notation.

In view of the foregoing, it would be highly desirable to develop a technique that is operative in a standard exponential notation computation environment, but afforded enhanced data transport and computation operations through use of a non-standard exponential data format.

SUMMARY OF THE INVENTION

The invention includes a method of transferring data in a computing system. The computing system is configured to process floating-point data of a first fixed size (e.g., 32 bit floating-point data). The floating-point data of the first fixed size is converted to floating-point data of a second, smaller fixed size (e.g., 16 bit floating-point data). The smaller fixed size floating-point data facilitates data transfer for computational operations that rely upon transferring vast amounts of data, such as graphics computations. Since the computing system is configured to process floating-point data of a larger fixed size, special conversion and transmittal techniques are required in accordance with the invention.

In one embodiment of the invention, the original, large floating-point data is converted to smaller graphics floating-point data in a central processing unit. Since the central processing unit is not configured to process the smaller graphics floating-point data, it is transmitted from the central processing unit, to a bridge circuit, and to main memory. The graphics floating-point data is subsequently transmitted from the main memory, to the bridge circuit, to the central processing unit, to the bridge circuit, and to a graphics processor. In one embodiment, the transfer occurs in response to a driver module executed by the central processing unit. In another embodiment, the graphics floating-point data is transmitted from the main memory, to the bridge circuit and to the graphics processor in response to a direct memory access command from the graphics processor. In this embodiment, graphics floating-point data indices may be stored in main memory. The graphics floating-point data indices are routed from the main memory, to the bridge circuit, to the central processing unit, and to the graphics processor.

In another embodiment, a driver module executed by the central processing unit coordinates the conversion from the floating-point data to the graphics floating-point data. In this embodiment, the graphics floating-point data is transmitted from the central processing unit, to a bridge circuit, and to a graphics processor.

In another embodiment of the invention, the conversion from floating-point data to graphics floating-point data is performed in a graphics processor. In this configuration, the graphics floating-point data is transmitted from the graphics processor to a graphics memory.

An embodiment of the invention includes a method of processing data in a computing system by operating a graphics processing unit configured to process floating-point data of a first fixed size, receiving at the graphics processing unit graphics floating-point data of a second fixed size smaller than the first fixed size; and processing the graphics floating-point data in the graphics processing unit. The graphics floating-point data may be transmitted from the graphics processor to a graphics memory.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
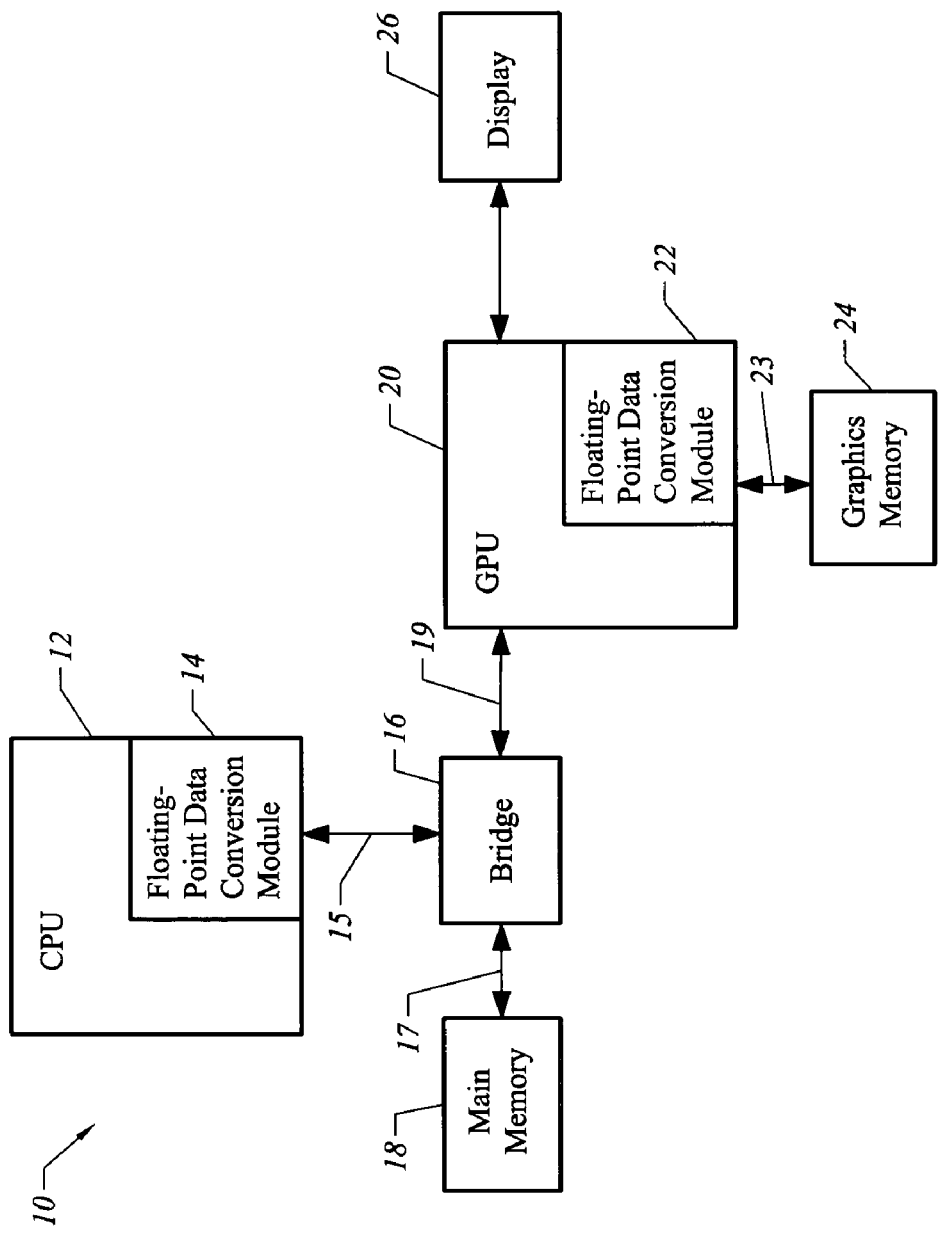
FIG. 1 illustrates a graphics processing system that may be utilized in accordance with an embodiment of the invention.

FIG. 1 illustrates a computing system 10 configured in accordance with an embodiment of the invention. The computing system 10 includes a central processing unit (CPU) 12 with a floating-point data conversion module 14 configured in accordance with an embodiment of the invention. The CPU 12 is linked to a bridge 16 via a communication channel 15 (e.g., a set of leads). The bridge 16 is connected to main or primary memory 18 via a communication channel 17. The bridge 16 is also connected to a graphics-processing unit 20 via a communication channel 19. The graphics-processing unit (GPU) 20 includes a floating-point data conversion module 22 in accordance with an embodiment of the invention. The GPU 20 is connected to a graphics memory 24 via a communication channel 23. Output from the GPU 20 is applied to a display 26. The various communication channels 15, 17, 19, and 23 form an interconnect grid between sub-systems (CPU 12, bridge 19, main memory 18, GPU 20, and graphics memory 24) of the computing system 10.

The computing system 10 is exemplary in form. Various components may be combined. For example, the bridge 16 may be combined with the CPU 12, or the GPU 20 may be combined with the bridge 16. The CPU 12 can represent a host computer, such as a personal computer, server, game system, or the like.

The GPU 20 includes standard GPU components. For example, the GPU 20 may include a geometry processor for performing vector floating-point operations. The geometry processor passes processed data to a rasterizer. The output of the rasterizer may be processed by a fragment processor to perform prior art texture and shading functions. A raster output processor processes data from the fragment processor. The raster output processor delivers data to the display 26. Alternately, the raster output data is delivered to a network, electronic control system, another graphics sub-system, or the like. In this sense, the GPU 20 operates in accordance with prior art techniques.

Thus, many aspects of the computing system 10 are consistent with the prior art. However, unlike the prior art, the computing system 10 is configured to process two types of floating-data. The computing system 10 is configured to process floating-point data of a first fixed size (e.g., 32 bit floating-point data). The floating-point data of the first fixed size is converted to floating-point data of a second, smaller fixed size (e.g., 16 bit floating-point data). Alternately, the computing system 10 configured to process floating-point date of a first fixed size may read and process data of a second, smaller fixed size. The smaller fixed size floating-point data, referred to as graphics floating-point data or compressed floating-point data, facilitates data transfer in the computing system 10. In addition, the graphics floating-point data may facilitate enhanced computation speed.

The graphics floating-point data is a truncated version of the standard fixed size floating-point data that the system is configured to process. Eliminating the least significant bits of the standard fixed size floating-point data may form the truncated data. Thus, for example, the exponent bits and/or the fraction bits may be truncated. This truncation operation may be accompanied by rounding of the remaining most significant bit or bits. The truncation operation may be performed in connection with various graphics data, such as data specifying position, color, texture, and the like.

The smaller graphics floating-point data operates to accelerate data transfers within the computing system 10 and thereby improve system performance. Since the computing system 10 is configured to process floating-point data of a larger fixed size, special conversion and transmittal techniques are required in accordance with the invention. These techniques are discussed below.

Figure 2:
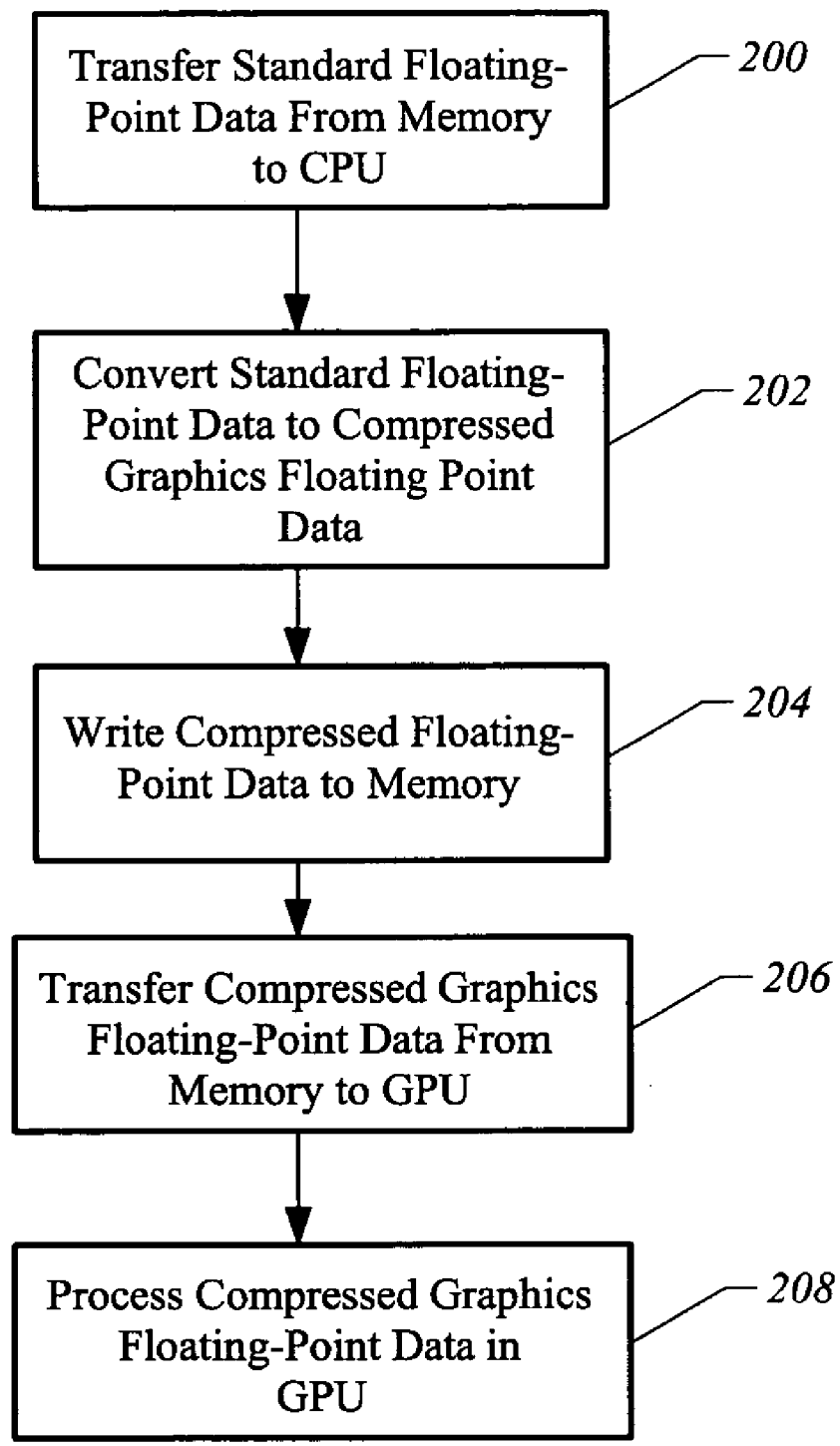
FIG. 2 illustrates processing associated with CPU floating-point data conversion and software driver data transfers performed in accordance with an embodiment of the invention.

FIG. 2 illustrates processing associated with CPU floating-point data conversion and software driver data transfers performed in accordance with an embodiment of the invention. The first operation of FIG. 2 is to transfer standard fixed-size floating-point data from memory 18 to CPU 12 (200). Thus, a data transfer from memory 18 to bridge 16, to CPU 12 is performed in accordance with prior art techniques.

In this embodiment, the standard fixed-size floating-point data is compressed to graphics floating-point data (202) in the CPU 12. In particular the floating-point data conversion module 14 is used to perform this operation. The floating-point data conversion module 14 may be implemented as a set of executable code or it may be hardwired into the CPU 12.

As previously indicated, the compression may be achieved by truncating the least significant bits of the standard fixed-sized floating-point data. As discussed above, the single-precision IEEE standard specifies that the first bit is a sign bit, the next eight bits are exponent bits, and the final 23 bits represent a fraction. In one embodiment of the invention, this standard format is converted to a format with a sign bit, five exponent bits, and ten fraction bits. Naturally, other schemes may be used in accordance with the invention.

The compressed graphics floating-point data is then written to memory (204). A transmission path from the CPU 12, to the bridge 16, to the main memory 18 may be used.

The compressed graphics floating-point data in memory is then transferred to the GPU via software driver instructions (206). The software driver instructions may form a part of the floating-point data conversion module 14. In this case, the graphics floating-point data moves from memory 18, through bridge 16, through CPU 12, through bridge 16, and into GPU 20. Observe here that the compressed graphics floating-point data has a smaller footprint and thereby reduces traffic on various communication channels from the memory 18 to the GPU 20. The GPU 20 subsequently processes the graphics floating-point data (208).

Figure 3:
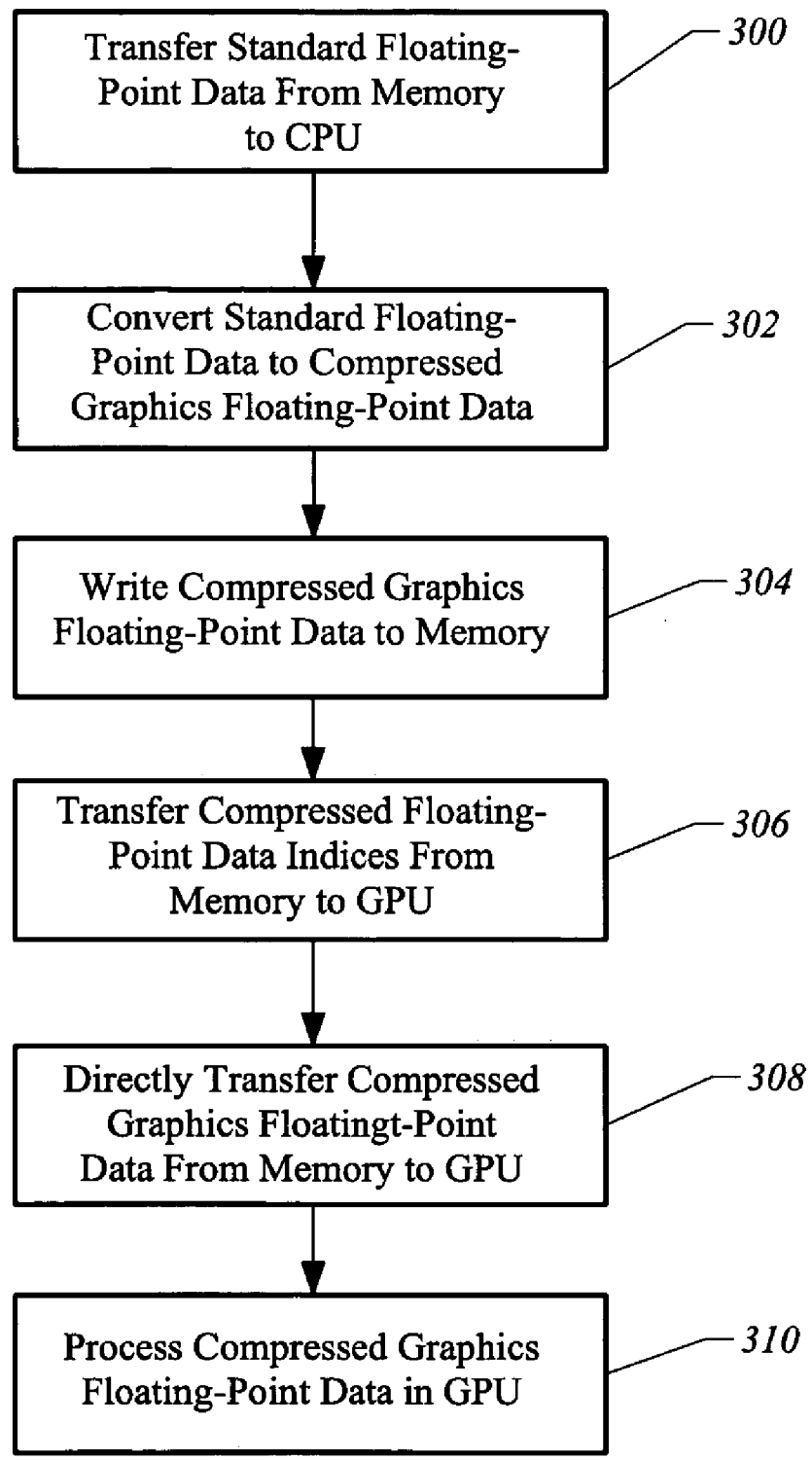
FIG. 3 illustrates processing associated with CPU floating-point data conversion and direct memory access data transfers performed in accordance with an embodiment of the invention.

FIG. 3 illustrates an alternate embodiment of the invention with CPU floating-point data conversion and direct memory access data transfers. The first operation of FIG. 3 is to transfer standard size floating-point data from memory to the CPU (300). This operation may be performed in accordance with prior art techniques for transferring data from memory 18, through bridge 16, and into CPU 12. The CPU then converts the standard size floating-point data to compressed graphics floating-point data (302). As discussed above, the floating-point data conversion module 14 may implement this operation.

The compressed graphics floating-point data is then written to memory (304). This can be implemented by the CPU 12 writing the data to the bridge 16, which writes the data to memory 18.

Floating-point data indices are then transferred from the memory to the GPU (306). These indices can traverse from the memory 18, to the bridge 16, to the CPU 12, to the bridge 16, to the GPU 20. Passing the floating-point data indices in this manner allows the graphics floating-point data to be transferred directly from the memory 18 to the GPU 20. During this direct memory access (DMA), memory must be locked down using standard techniques.

The next operation of FIG. 3 is to directly transfer compressed floating-point data from memory to the GPU (308). This DMA moves data directly from memory 18, across bridge 16, and into GPU 20. The GPU subsequently processes the graphics floating-point data (310).

Figure 4:
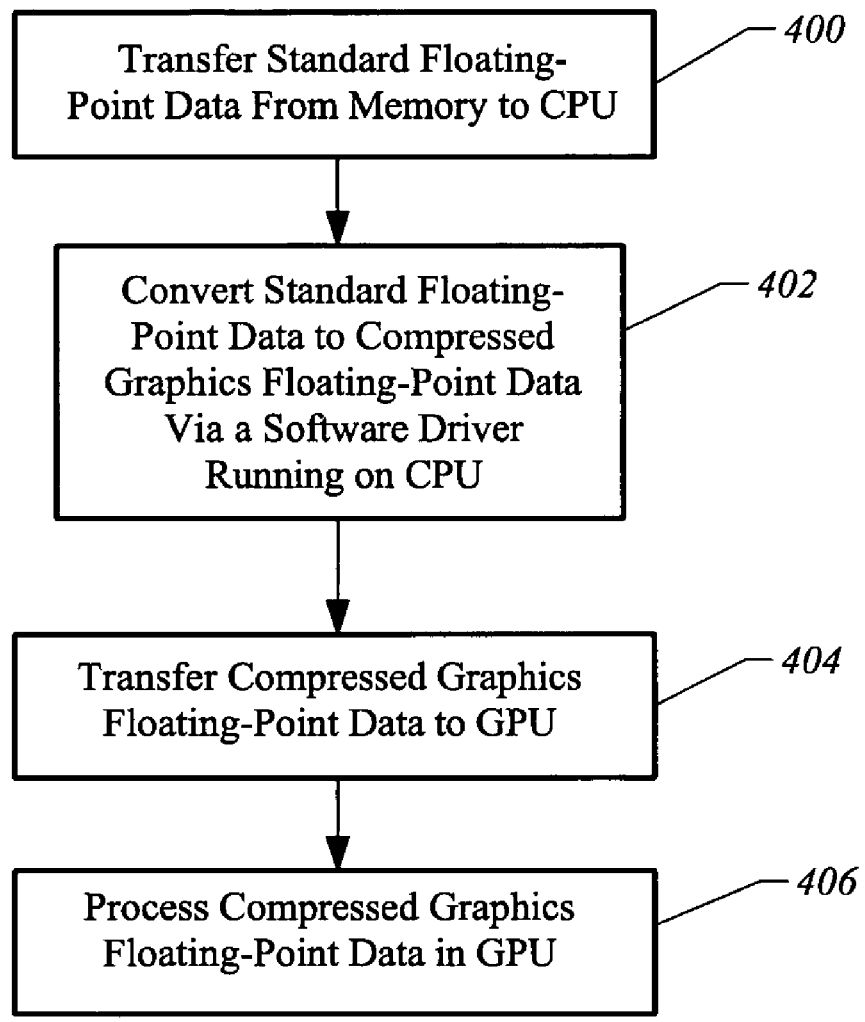
FIG. 4 illustrates processing associated with CPU floating-point data conversion via a software driver in accordance with an embodiment of the invention.

FIG. 4 illustrates another embodiment of the invention in which CPU floating-point data conversion is performed via a software driver. The first operation of FIG. 4 is to transfer standard size floating-point data from memory to the CPU (400). A standard data transfer from the memory 18, through the bridge 16, and into the CPU 12 may be used to implement this operation.

Next, the standard floating-point data is converted to compressed graphics floating-point data via a software driver running on the CPU (402). The floating-point data conversion module 14 may include a software driver to accomplish this function.

The compressed graphics floating-point data is then transferred from the CPU to the GPU (404). In particular, the CPU 12 passes the graphics floating-point data to the bridge 16, which passes the data to the GPU 20. The GPU then processes the graphics floating-point data (406).

Figure 5:
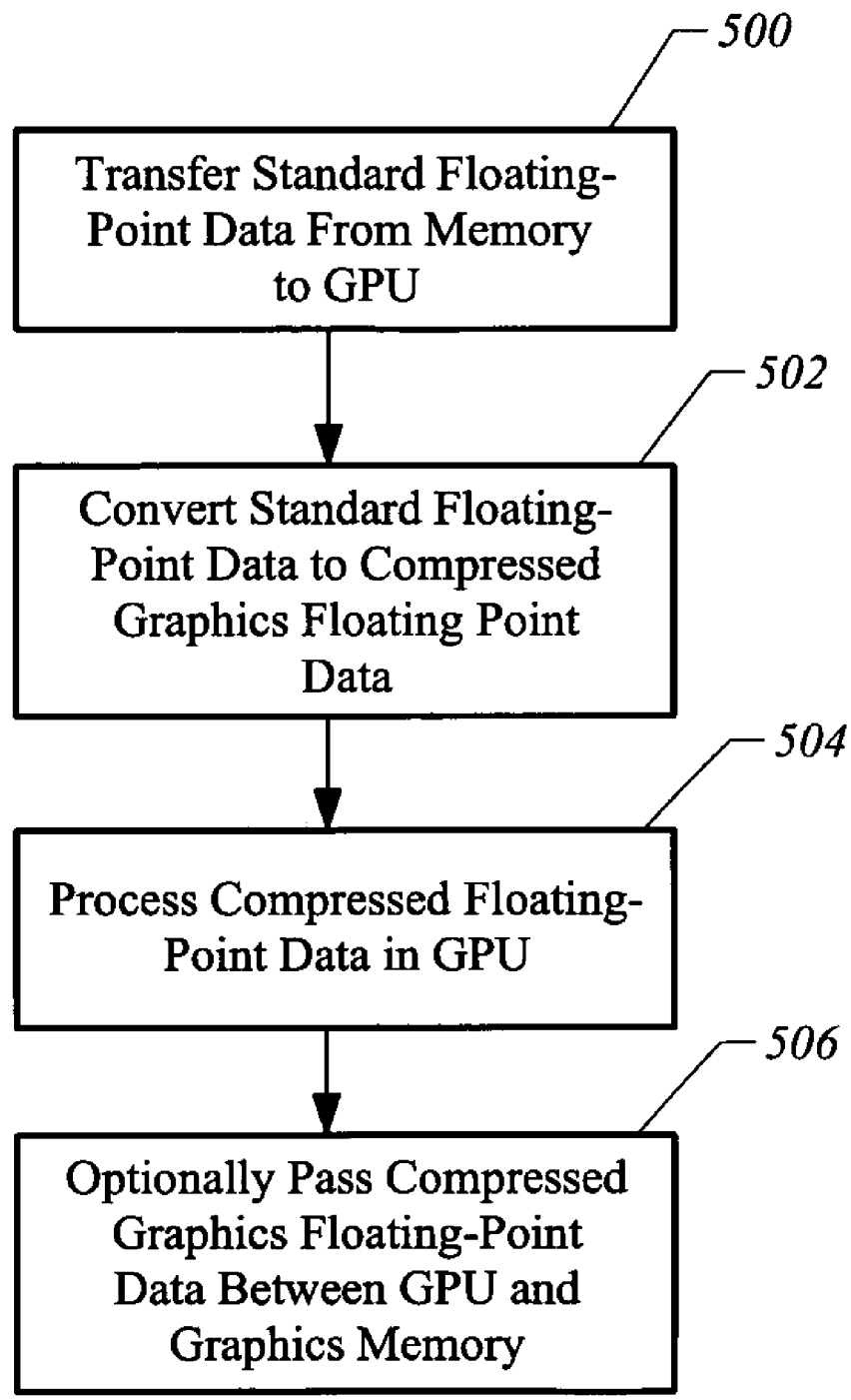
FIG. 5 illustrates processing associated with GPU floating-point data conversion performed in accordance with an embodiment of the invention.

FIG. 5 illustrates another embodiment of the invention. In this embodiment, floating-point data conversion is performed in the GPU 20. The first operation in this embodiment is to transfer standard floating-point data from memory to the GPU (400). In particular, the CPU 12 passes instructions to the bridge 16, which causes the memory 18 to transfer standard floating-point data to the bridge 16 and into the GPU 20. The GPU then converts the standard floating-point data to compressed graphics floating-point data (402). The floating-point data conversion module 22 may be used to implement this operation Compressed graphics floating-point data is then processed by the GPU (404). Compressed and processed graphics floating-point data may be optionally passed to graphics memory 24 (406). This operation may be repeated several times, if necessary.

In another embodiment of the invention, the main memory 18 transfers compressed graphics floating-point data to the bridge 16 and into the GPU 20 for immediate processing. In other words, in this embodiment the GPU 20 and the CPU 12 do not perform a floating-point conversion operation. Instead, the graphics program may already be configured in a compressed graphics floating-point data format, even though the program is running on a machine configured for standard floating-point values. The GPU 20 may also be configured to read compressed graphics floating-point data directly from a program stored on a DVD, CD of the like.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of transferring data in a computing system, comprising:
   generating floating-point data of a first fixed size in a computing system configured to process floating-point data of said first fixed size;
   converting said floating-point data to graphics floating-point data of a second fixed size smaller than said first fixed size by truncating least significant bits of said floating-point data,
      wherein converting includes converting said floating-point data to said graphics floating-point data in a central processing unit;
   transmitting said graphics floating-point data between sub-systems of said computing system,
      wherein transmitting includes transmitting said graphics floating-point data from said central processing unit, to a bridge circuit, and to main memory;
      wherein transmitting includes transmitting said graphics floating-point data from said main memory to said bridge circuit and to a graphics processor;
      wherein transmitting includes transmitting said graphics floating-point data in response to a direct memory access command from said graphics processor; and
   processing said graphics floating-point data in said graphics processor.

2. The method of claim 1 wherein generating includes generating 32 bit floating-point data.

3. The method of claim 2 wherein converting includes converting said 32 bit floating-point data to 16 bit graphics floating-point data.

4. The method of claim 1 wherein transmitting includes utilizing graphics floating-point data indices stored in said main memory.

5. The method of claim 4 wherein transmitting includes transmitting graphics floating-point data indices from said main memory, to said bridge circuit, to said central processing unit, and to said graphics processor.

6. A computing system, comprising:
- a graphics processor configured to process floating-point data of a first fixed size;
- a graphics memory;
- main memory;
- a central processing unit configured to process floating-point data of a said first fixed size;
- a bridge circuit; and
- an interconnect grid including communication channels of said first fixed size to link said graphics processor, said graphics memory, said main memory, said central processing unit, and said bridge circuit;
- wherein said computing system is operative to exchange and process graphics floating-point data corresponding to said floating-point data over at least a portion of said interconnect grid, wherein said graphics floating-point data has a second fixed size smaller than said first fixed size to accelerate data transfers, wherein said second fixed size is established by truncating least significant bits of said floating-point data.

7. The computing system of claim 6 wherein said central processing unit converts said floating-point data to said graphics floating-point data.

8. The computing system of claim 6 wherein said graphics processor converts said floating-point data to said graphics floating-point data.

9. The computing system of claim 6 wherein said floating-point data is 32 bit floating-point data.

10. The computing system of claim 6 wherein said graphics floating-point data is 16 bit graphics floating-point data.

* * * * *